(12) United States Patent
Park et al.

(10) Patent No.: US 8,933,894 B2
(45) Date of Patent: Jan. 13, 2015

(54) LIQUID CRYSTAL DISPLAY DEVICE WITH A BUILT IN TOUCH SCREEN WITH LIGHT SENSOR

(75) Inventors: Jin-Woo Park, Yongin (KR); Sang-Uk Kim, Yongin (KR); Hee-Chul Hwang, Yongin (KR); Mu-Kyung Jeon, Yongin (KR); Hideo Yoshimura, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 926 days.

(21) Appl. No.: 12/789,930

(22) Filed: May 28, 2010

(65) Prior Publication Data

US 2011/0057908 A1 Mar. 10, 2011

(30) Foreign Application Priority Data

Sep. 8, 2009 (KR) .................. 10-2009-0084412

(51) Int. Cl.
 *G06F 3/041* (2006.01)
 *G06F 3/042* (2006.01)
 *G02F 1/1333* (2006.01)
 *G02F 1/133* (2006.01)

(52) U.S. Cl.
 CPC .............. *G06F 3/042* (2013.01); *G06F 3/0412* (2013.01); *G02F 1/13338* (2013.01); *G02F 1/13318* (2013.01)
 USPC ....................................................... 345/173

(58) Field of Classification Search
 USPC .................................. 345/156, 173–178, 207
 See application file for complete search history.

(56) References Cited

U.S. PATENT DOCUMENTS

| | | | |
|---|---|---|---|
| 2008/0055262 A1* | 3/2008 | Wu et al. ................. | 345/173 |
| 2008/0117182 A1* | 5/2008 | Um et al. ................ | 345/173 |
| 2008/0246708 A1* | 10/2008 | Ishiguro ................... | 345/87 |
| 2008/0246905 A1* | 10/2008 | Chen et al. .............. | 349/106 |
| 2009/0161051 A1* | 6/2009 | Fukunaga et al. ...... | 349/115 |

FOREIGN PATENT DOCUMENTS

| | | |
|---|---|---|
| JP | 2005-301373 | 10/2005 |
| JP | 2006-251636 | 9/2006 |

(Continued)

OTHER PUBLICATIONS

Office action dated Jan. 31, 2012 for corresponding Japanese Patent Application No. 2009-281811, 2pp.

(Continued)

*Primary Examiner* — Ram Mistry
(74) *Attorney, Agent, or Firm* — Christie, Parker & Hale, LLP (57) ABSTRACT

A liquid crystal display device having a built in touch screen including a first substrate having pixel units comprising: a plurality of pixels displaying an image and sensor regions having light sensors formed adjacent to the corresponding pixel units to sense a position of a contacted object; a second substrate disposed on the first substrate, comprising: color filters formed on regions corresponding to the pixel units and first black matrices formed on regions corresponding to the sensor regions of the pixel units; a liquid crystal layer interposed between the first substrate and the second substrate; and a backlight assembly disposed on a bottom portion of the first substrate and providing light to the first substrate and the second substrate. The liquid crystal display device with the built in touch screen determines a point of contact on the touch screen.

20 Claims, 8 Drawing Sheets

(56) References Cited

FOREIGN PATENT DOCUMENTS

| | | |
|---|---|---|
| JP | 2007-304245 | 11/2007 |
| JP | 2008-058934 | 3/2008 |
| JP | 2009-048145 | 3/2009 |
| JP | 2011-054792 | 3/2011 |
| KR | 1020070008743 A | 1/2007 |
| KR | 10-2007-0026499 | 3/2007 |
| KR | 10-2008-0044017 | 5/2008 |
| KR | 10-2008-0089115 | 10/2008 |
| KR | 1020090067043 A | 6/2009 |
| KR | 10-2009-0084644 | 8/2009 |
| KR | 1020090097095 A | 9/2009 |
| WO | WO 2005/101367 A2 | 10/2005 |

OTHER PUBLICATIONS

KIPO Office action dated Mar. 21, 2011, for Korean priority Patent application 10-2009-0084412, noting listed reference in this IDS.
Korean Office action dated Oct. 27, 2011 issued in Korean Priority Application No. 10-2009-0084412, 1 page.

* cited by examiner

LIQUID CRYSTAL DISPLAY DEVICE WITH A BUILT IN TOUCH SCREEN WITH LIGHT SENSOR

CROSS-REFERENCE TO RELATED APPLICATION

This application claims the benefit of Korean Patent Application No. 10-2009-0084412, filed Sep. 8, 2009 in the Korean Intellectual Property Office, the disclosure of which is incorporated herein by reference.

BACKGROUND

1. Field

Aspects of the present invention relate to a liquid crystal display device, and more particularly, to a liquid crystal display device with a built in touch screen, having a panel in which a light sensor is provided.

2. Description of the Related Art

A touch screen is provided on a top surface of an image display device so that instruction contents displayed on the screen of the image display device can be selected using a human hand or an object. The touch screen is contacted directly by the human hand and/or the object. Therethrough, the touch screen determines a contact position and the image display device receives the instruction contents corresponding to the contact position as input signals to be driven according to the input signals.

The image display device having the touch screen does not require a separate input device connected to the image display device in order to be operated, such as a keyboard and a mouse, thus, the usage thereof tends to increase.

Recently, the touch screen is also used in a liquid crystal display device. The liquid crystal display device with the touch screen includes a liquid crystal display panel that displays an image and a touch screen panel that is provided on the top side of the liquid crystal display panel in order to receive a predetermined input from a user and to detect position information.

At this time, in order to position the touch screen panel on the top side of the liquid crystal display panel, a frame having an air layer between the liquid crystal display panel and the touch screen or adhesive is used. However, in this case, a layer having different refractive index from refractive index of the liquid crystal display panel and the touch screen panel is generated between the liquid crystal display panel and the touch screen panel, and thus, the optical characteristics of the liquid crystal display device are degraded.

Consequently, a separate touch screen panel is manufactured and attached to the liquid crystal display panel, and has disadvantages including increased manufacturing costs and increased thickness of the liquid crystal display device.

SUMMARY

Aspects of the present invention provide a liquid crystal display device with a built in touch screen, having light sensors provided within a lower substrate of a panel, in which black matrices (BM) are formed on regions of an upper substrate, corresponding to the positions of the light sensors, to block light incident from the outside and the contact positions are sensed through the difference in degree of the light incident from the internal backlight to be reflected on the black matrices so that touch recognition can be performed regardless of illumination environment of external light.

According to an aspect of the present invention, there is provided a liquid crystal display device having a built in touch screen, including: a first substrate having pixel units including: a plurality of pixels displaying an image and sensor regions having light sensors formed adjacent to the corresponding pixel units to sense a position of a contacted object; a second substrate disposed on the first substrate, including: color filters formed on regions corresponding to the pixel units; and first black matrices formed on regions corresponding to the sensor regions of the pixel units; a liquid crystal layer interposed between the first substrate and the second substrate; and a backlight assembly disposed on a bottom portion of the first substrate and providing light to the first substrate and the second substrate.

According to an aspect of the present invention, second black matrices are formed on a first surface of the first substrate and corresponding to the sensor regions to prevent light from the backlight assembly being directly incident upon the light sensors.

According to an aspect of the present invention, the plurality of pixels are arranged in the pixel unit so that the plurality of pixels in each of the pixel units correspond to R, G, and B colors, and the light sensors and the pixel units have at most a 1:1 ratio.

According to an aspect of the present invention, the light sensors detect the touch position by sensing a change in quantities of light emitted from the backlight assembly and reflected from the first black matrices to the light sensors.

According to an aspect of the present invention, further included are reflective parts having a predetermined thickness and formed on bottom surfaces of the first black matrices, and a thickness of each of the reflective parts is less than a thickness of a liquid crystal layer formed between the first substrate and the second substrate, and the reflective part is formed in a barrier rib shape.

According to an aspect of the present invention, further included are reflective parts having a predetermined thickness formed on bottom surfaces of the light sensors or reflective parts formed on the bottom surfaces of the first black matrices and on the bottom surfaces of the light sensors, respectively.

According to aspects of the present invention, the black matrices (BM) are formed on regions of an upper substrate, corresponding to the positions of the light sensors, to block light incident from the outside and the contact positions are sensed through the difference in degree of the light incident from the internal backlight to be reflected on the black matrices so that touch recognition can be performed regardless of illumination environment of external light.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7A through FIG. 10 are schematic cross-sectional views of a portion of a liquid crystal display device with a built in touch screen according to another embodiment of the present invention.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, it is to be understood that where is stated herein that one element or layer is "formed on," "formed over" or "disposed on" a second element or layer, the first element or layer may be formed or disposed directly on the second element or layer or there may be intervening elements or layers between the first element or layer and the second element or layer. Further, as used herein, the terms "formed on" and "formed over" are used with the same meaning as "located on" or "disposed on" and are not meant to be limiting regarding any particular fabrication process. Hereinafter, exemplary embodiments of the present invention will be described in more detailed with reference to the accompanying drawings.

Figure 1:
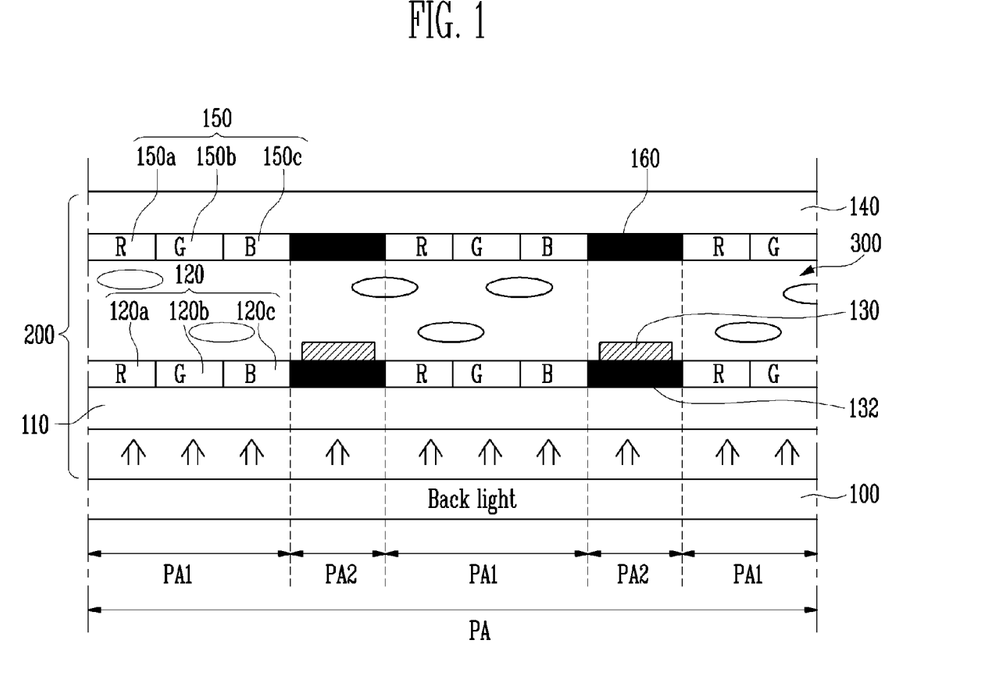
FIG. 1 is a schematic cross-sectional view of a portion of a liquid crystal display device with a built in touch screen according to one embodiment of the present invention.

FIG. 1 is a schematic cross-sectional view of a portion of a liquid crystal display device having a built in touch screen according to one embodiment of the present invention. Referring to FIG. 1, the liquid crystal display device includes a liquid crystal display panel 200 displaying an image and sensing the position of a contacted object, and a backlight assembly 100 providing light to the liquid crystal display panel 200. The liquid crystal display panel 200 includes a first substrate 110, a second substrate 140 disposed so as to be opposed to the first substrate 110, and a liquid crystal layer 300 interposed between the two substrates 110, 140.

Moreover, although not shown in FIG. 1, in order to hold the liquid crystal layer 300, a pair of alignment layers aligning the arrangement direction of liquid crystal molecules of the liquid crystal layer 300 are formed on the inner side surfaces of the two substrates, and first and second polarizers are installed on both sides of the liquid crystal panel 200 so as to face each other.

As shown in FIG. 1, light sensors 130 detect the positions of the object (not shown) contacting the liquid crystal display panel 200. The light sensors 130 are provided on the first substrate 110 facing the liquid crystal layer 300. The light sensors 130 also provide a function of a touch screen within the liquid crystal display panel 200, and are disposed at regular intervals on the display region PA of the first substrate. However, it is understood that the distribution need not be regular in all aspects, such as where a touch screen function is not needed in all portions of the display region PA or where different portions of the region PA have different resolutions.

FIG. 1 shows a cross-section of the liquid crystal panel 200 in which the light sensors 130 are disposed in a matrix shape. Portions of the display region PA where the light sensors 130 are formed are defined as a sensor region PA2, and regions other than the sensor region PA2 are defined as a pixel region PA1. The pixel region PA1 has a pixel unit 120 having pixels 120a, 120b, and 120c corresponding to a plurality of colors such as red R, green G, blue B, or other colors. A division of colors is determined according to transmission wavelength characteristics of a color filter 150 to which each pixel unit 120 is opposed.

In other words, the color filter 150 is formed in the second substrate 140 so as to respectively correspond to each color of the pixels 120a, 120b, and 120c, as shown in FIG. 1.

Although not shown in FIG. 1, a pixel electrode and a common electrode are formed in the pixel region PA1, wherein the pixel electrode and the common electrode are formed of transparent electrode material. Generally, the pixel electrode is formed per each the pixels 120a, 120b, and 120c of the first substrate and the common electrode is formed over the second substrate opposed to the pixel electrode and the liquid crystal layer 300 is formed therebetween.

Although not shown in FIG. 1, each of the pixels 120a, 120b, 120c include a sub-capacity and a switching element. The sub-capacity that assists the liquid crystal capacity between the pixel electrode and the common electrode according to the structure of the pixel, and a switching element that controls a potential applied to the pixel electrode according to a potential of an image signal are also formed on each of the pixels 120a, 120b, and 120c provided in the pixel region PA1.

In the pixel unit 120, the disposition density of the light sensors 130 is maximized when a ratio of the light sensors 130 to the pixel units 120 is 1:1, or in other words, there is one light sensor 130 per each pixel unit 120 in the liquid crystal display device. In the present embodiment illustrated in FIG. 1, the disposition density of the light sensors 130 maximized or smaller than the maximum. However, aspects of the present invention are not limited thereto.

The backlight assembly 100 is disposed on a rear side of the first substrate 110. The backlight assembly 100 faces a rear surface of the liquid crystal panel 200 and emits light to the display region PA of the liquid crystal panel 200.

Herein, as shown in FIG. 1, the light emitted from the backlight assembly 100 is transmitted to the pixel region PA1 of the first substrate 110 and the color filter 150 of the second substrate 140. However, the light emitted from the backlight assembly 100 is blocked by a bottom portion of the sensor region PA2 of the first substrate 110 since second black matrices 132 are formed thereon. Additionally, in the embodiment of the present invention, as shown in FIG. 1, first black matrices 160 are formed on a second substrate 140 so as to correspond to the sensor region PA2 of the first substrate 110.

In the case of a light sensor type touch screen panel according to the related art, a hole or a transmission layer allowing external light to be incident on a sensor region is formed to sense a difference in a quantity of external light and to detect a touch. However, in the case of the embodiment of the present invention illustrated in FIG. 1, the first black matrices 160 are formed in the region to block the light incident from the outside.

In other words, the difference in the quantity of external light is not sensed. Rather, a difference in a quantity of internal light (that is, light incident from the backlight assembly 100 and reflected by the first black matrices 160) is sensed in order to determine the touch. Thereby, the touch is determined even in an environment without the external light.

More specifically, at a point of contact where a hand and/or an object contacts the second substrate 140 in which the first black matrices 160 are formed, the second substrate 140 is pressed by a predetermined pressure resulting from the hand and/or object contacting the second substrate 140. In this case, a path of light at the point of contact becomes different from a case having a path of light at a point having no contact.

In both cases, light is emitted from the backlight assembly 100 and then reflected on the first black matrices 160 to be incident on the light sensors 130. As a result of the paths of light being different, a difference in the quantity of light incident on light sensors 130 corresponding to the point of contact and the point having no contact is sensed, thus making it possible to perform the touch recognition. While not required in all aspects, the matrices 160 do not completely absorb all light, and reflect at least a portion of the light.

Figure 2:
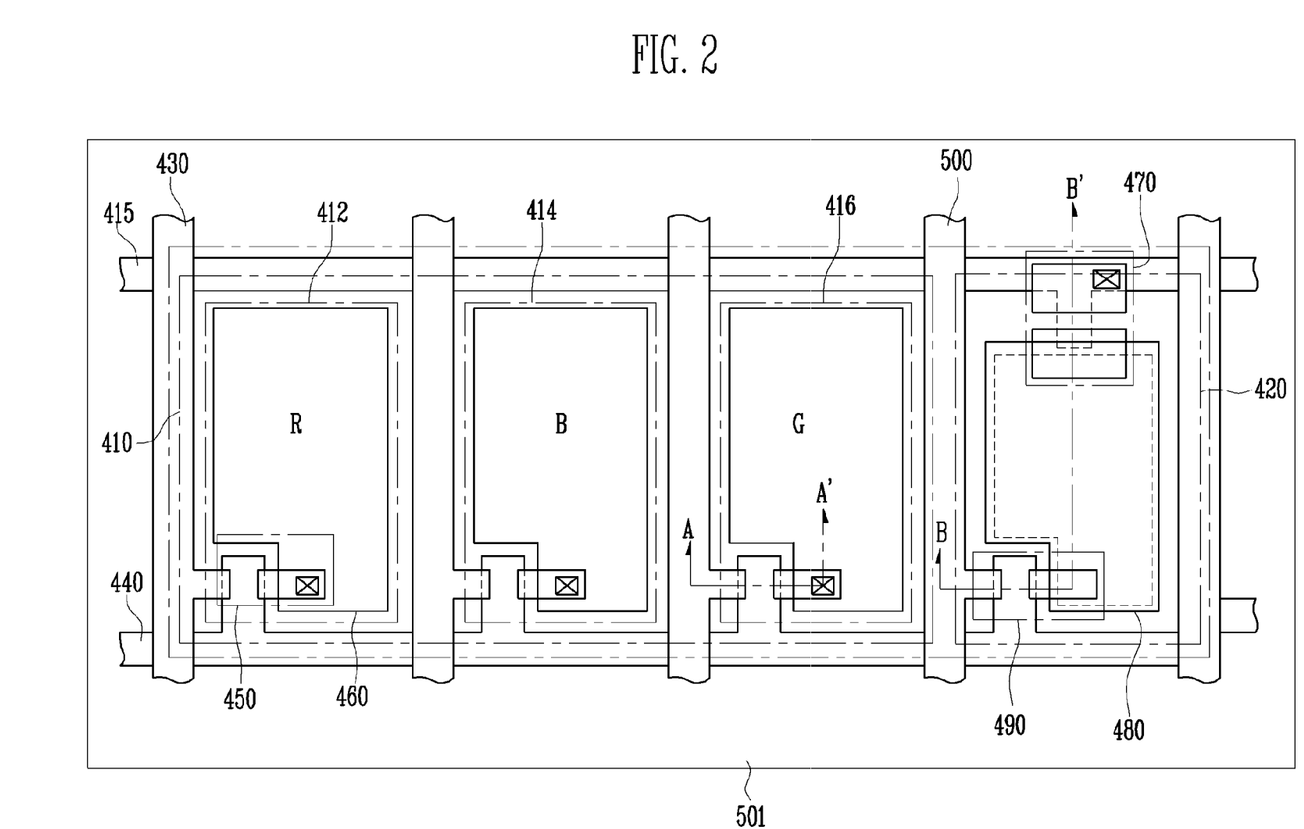
FIG. 2 is a plan view of the pixel unit of the first substrate of FIG. 1 and the light sensor adjacent thereto.
Figure 3:
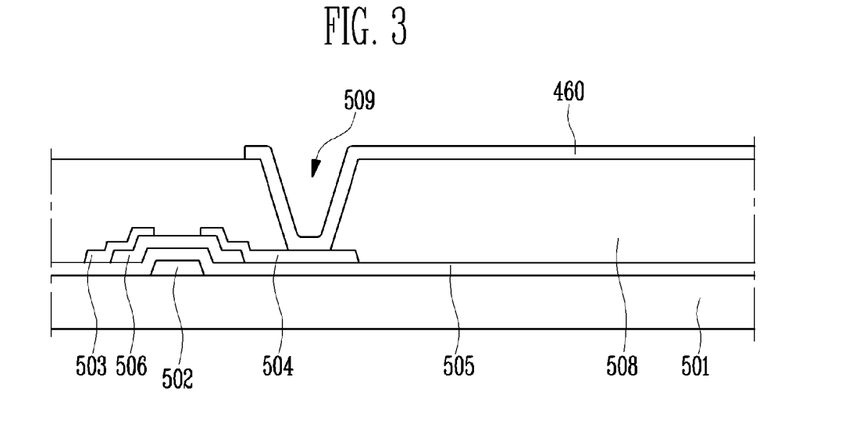
FIG. 3 is a cross-sectional view taken along line A-A' of FIG. 2.
Figure 4:
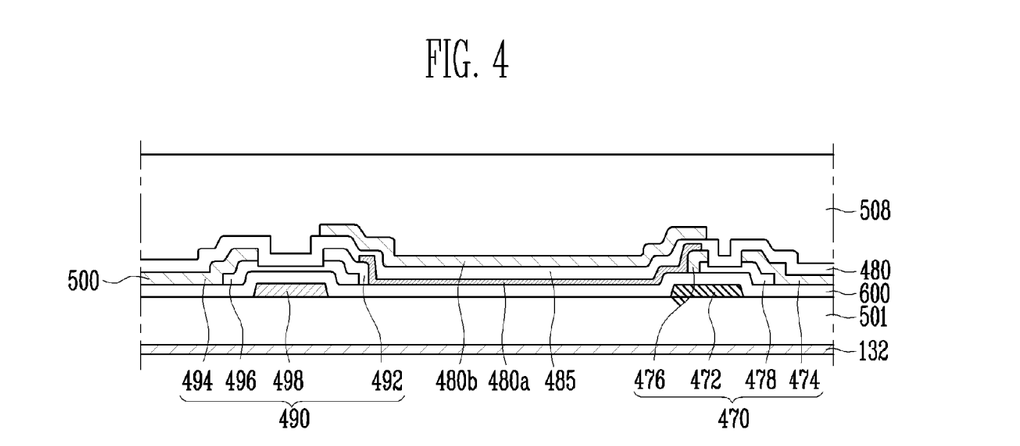
FIG. 4 is a cross-sectional view taken along line B-B' of FIG. 2.

FIG. 2 is a plan view of the pixel unit 410 of the first substrate 501 of FIG. 1 and the light sensors 420 adjacent thereto. FIG. 3 is a cross-sectional view taken along line A-A' of FIG. 2. FIG. 4 is a cross-sectional view taken along line B-B' of FIG. 2. However, the constitution of the light sensor 420 of FIGS. 2 and 4 is merely one embodiment and aspects of the present invention are not limited thereto.

With reference to FIG. 2 and FIG. 3, the first substrate 501 includes a plurality of pixel units 410 disposed in a matrix shape and light sensors 420 provided adjacent to the pixel units 410, respectively. FIG. 2 shows a pixel region PA1 corresponding to one pixel unit 120 of FIG. 1 and a sensor region PA2 corresponding to one light sensor 130 of FIG. 1.

Each of the plurality of pixel units 410 includes an R pixel 412, a G pixel 414, and a B pixel 416, wherein the R pixel 412, the G pixel 414, and the B pixel 416 are formed at points where a plurality of data lines 430 intersect with a plurality of gate lines 440. The plurality of data lines 430 extend in a first direction and are spaced and arranged to have a predetermined interval in a second direction and the plurality of gate lines 440 extend in a second direction and are spaced and arranged to have a predetermined interval in a first direction, respectively.

At this time, the R pixel 412, the G pixel 414, and the B pixel 416 are arranged sequentially by being adjacent to each other. Also, the R pixel 412, the G pixel 414, and the B pixel 416 each include a driving TFT 450 that drives each liquid crystal and a pixel electrode 460 connected to the driving TFT 450.

As shown in FIGS. 2 and 3, the driving TFT 450, which is a switching element driving the liquid crystal 350. The TFT 450 has a gate electrode 502, a source electrode 503, and a drain electrode 504 formed on a first transparent substrate 501. The gate electrode 502 is isolated from the source electrode 503 and the drain electrode 504 by a gate dielectric layer 505. An active region 506 is formed on the gate dielectric layer 505 and the source electrode 503 and the drain electrode 504 are formed on the active pattern 506. As a voltage is applied to the gate electrode 502, the active region 506 applies a voltage to the drain electrode 540 from the source electrode 503.

An organic dielectric layer 508 is formed over the first transparent substrate 501 including the driving TFT 450, and a contact hole 509 partially exposing the drain electrode 504 of the driving TFT 450 is formed on the organic dielectric layer 508.

Moreover, the pixel electrode 460 is formed on the upper portion of the organic dielectric layer 508 at a uniform thickness and is electrically connected to the drain electrode 504 via the contact hole 509.

Meanwhile, as shown in FIGS. 2 and 4, the light sensor 420 is formed in a region adjacent to the R pixel 412, the G pixel 414, and the B pixel 416 and is defined by two of the plurality of data lines 430, the two of the plurality of data lines 430 being adjacent to each other.

As illustrated in FIG. 4, the light sensor 420 includes a sensor TFT 470 generating optical current according to the internal light (light emitted from the backlight assembly 100) reflected by the first black matrix 160 of FIG. 1 adjacent to an object contacting the liquid crystal display panel 310. The light sensor 420 also includes a storage capacitor 480 charged according to the generated optical current, and a switch TFT 490 outputting a voltage according to the charge in the storage capacitor 480. A data line 430 to which the switch TFT 490 is connected is used as a sensor outputting a sensed position sensing signal and hereinafter said data line 430 will be referred to as a sensor signal readout 500.

According to aspects of the present invention, the light sensor 130, 420 senses a difference between the optical current generated when the liquid crystal display panel is not contacted and the optical current generated when the liquid crystal display panel is contacted, thereby making it possible to perform a touch recognition.

In other words, the embodiment of the present invention performs the touch recognition using the internal light so that when the touch is not performed, optical current at a predetermined level is output from all of the light sensors 130, 420, but when being a touch contacts the liquid crystal display panel at a specific position, the first black matrix 160 adjacent to the specific position is pressed due to the contact. Thus, in the case having a touch contact the liquid crystal display panel, the internal light is incident on a specific light sensor 130, 420 through a different optical path compared to the case where there is no touch contacting the liquid crystal display panel. Consequently, the optical current output from the specific light sensor 130, 420 in the case having the touch contact the liquid crystal panel has different value from the optical current having a predetermined level. In other words, a specific touch position can be recognized by sensing a difference in optical current outputs. While not shown, it is understood that a controller detects the output optical current output of the readout 500 to detect the location on the panel at which the contact is made.

The gate electrode 472 of the sensor TFT 470 is connected to one of the plurality of gate lines 430 of a previous terminal. In other words, the gate electrode 472 of the sensor TFT 470 is connected to an $N-1^{st}$ gate line, when the gate electrode 502 of the respective driving TFT 450 of the R pixel 412, the G pixel 414, and the B pixel 416 is connected to an $N^{th}$ gate line.

Furthermore, a drain electrode 474 of the sensor TFT 470 is connected to the gate electrode 472, and a source electrode 476 of the sensor TFT 470 is electrically connected to a source electrode 492 of the switch TFT 490 through a first electrode 480a. A drain electrode 494 of the switch TFT 490 is connected to the sensor signal readout 500, though the connection is not shown in FIG. 4. A second electrode 480b is disposed above the first electrode 480a and the dielectric layer 485 is disposed between the first electrode 480a and the second electrode 480b. The first electrode 480a and the second electrode 480b function as the storage capacitor 480. The storage capacitor 480 is charged according to the quantity of light input to the sensor TFT 470.

A first active region 478 of amorphous silicon a-Si is formed between the source electrode 476 and the drain electrode 474 of the sensor TFT 470. A second active region 496 of amorphous silicon is formed between the source electrode 492 and the drain electrode 494 of the switch TFT 490. Herein, if at least a predetermined quantity of light is received in the first active region 478, the source electrode 476 and the drain electrode 474 of the sensor TFT 470 are electrically connected.

Furthermore, a gate dielectric layer 600 isolating the source electrodes 476 and 492 from the drain electrodes 474 and 494 is formed on upper portions of the gate electrode 472 of the sensor TFT 470 and the gate electrode 498 of the switch TFT 490, respectively.

As shown in FIG. 4, a second black matrix 132 is formed on one surface of the first substrate 110 (shown in FIG. 1) on which the light sensor 130, 420 is disposed. The second black matrix 132 is a light blocking layer preventing light from being directly incident from the backlight assembly 100 of FIG. 1.

Figure 5:
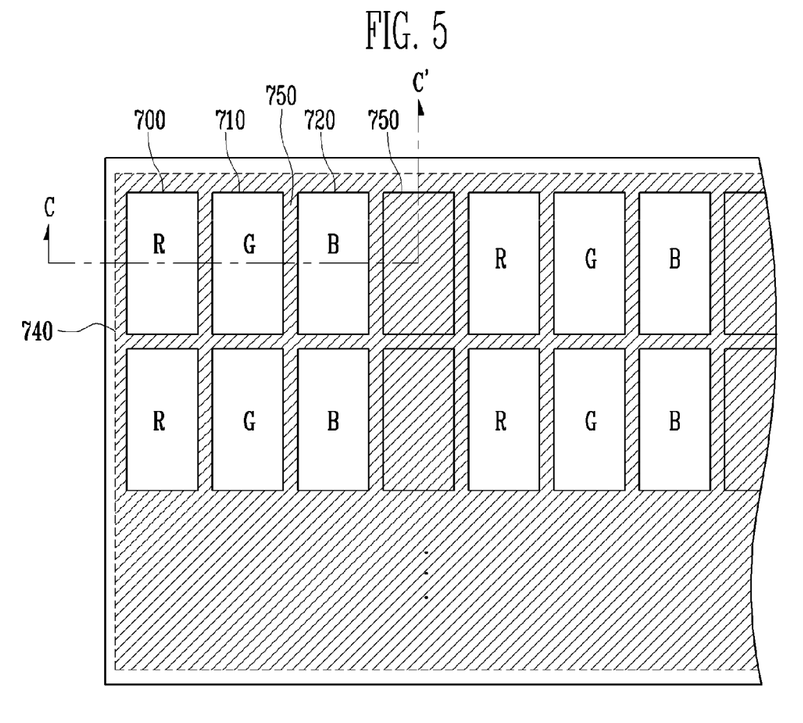
FIG. 5 is a plan view of the second substrate of FIG. 1.
Figure 6:
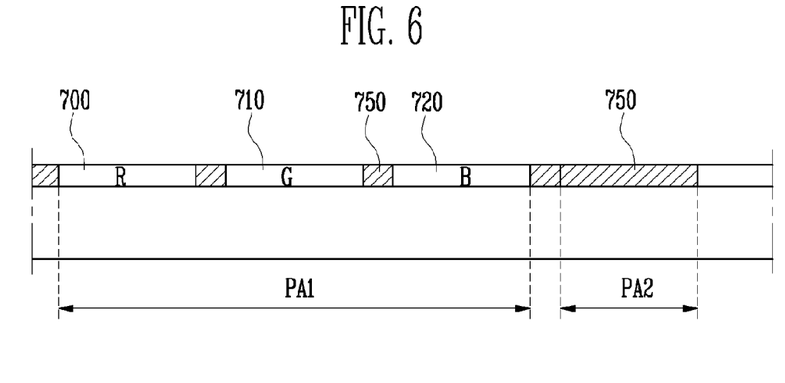
FIG. 6 is a cross-sectional view taken along line C-C' of FIG. 5.

FIG. 5 is a plan view of the second substrate 140 of FIG. 1, and FIG. 6 is a cross-sectional view taken along line C-C' of FIG. 5. As shown in FIG. 5, an R color filter 700, a G color filter 710, and a B color filter 720 are formed in the second substrate 740 so as to correspond to the R pixel 412, the G pixel 414, and the B pixel 416, respectively. The R color filter 700, the G color filter 710, and the B color filter 720 correspond to predetermined colors that are visible as light passes therethrough. First black matrices 750 are formed in regions other than the regions where the R color filter 700, the G color filter 710, and the B color filter 720 are formed.

In other words, the first black matrices 750 are formed in the regions between the R color filter 700, the G color filter 710, and the B color filter 720 in order to block light between a group of the R, G and B color filters 700, 710, and 720 and another group of the R, G and B color filters 700, 710, and 720. The first black matrices 750 are formed in the regions corresponding to the light sensors 130 of the first substrate 110 (see FIG. 1) in order to block light incident from the outside.

In addition, a common electrode (not shown) is formed on bottom portions of the color filters 700, 710, 720 and the first black matrices 750.

Figure 7A:
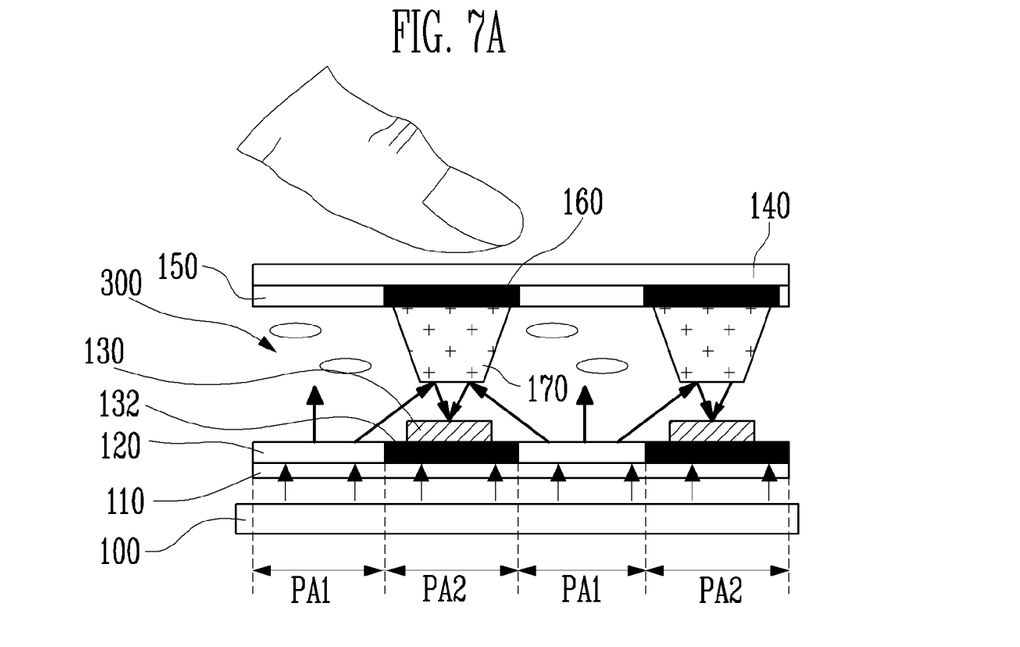
Figure 7B:
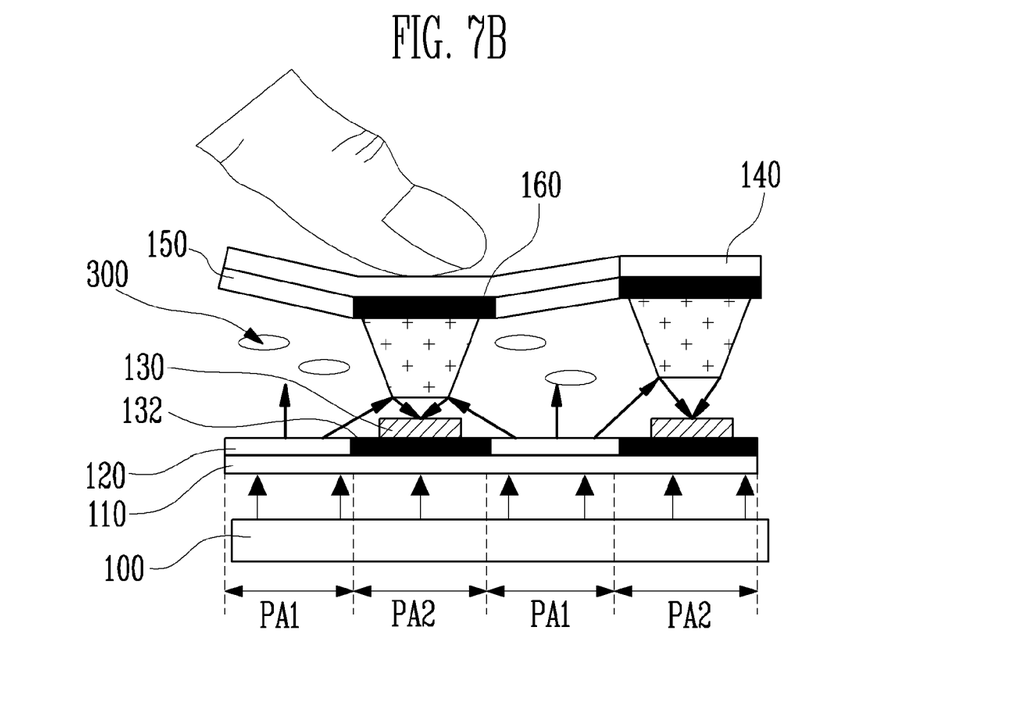

FIGS. 7A and 7B to FIG. 10 are schematic cross-sectional views of a portion of a liquid crystal display device with a built in touch screen according to another embodiment of the present invention. Referring to FIGS. 7A and 7B, a reflective part 170 having a predetermined thickness is formed on the bottom portions of the first black matrices 160 formed on the second substrate 140 corresponding to the sensor regions PA2 of the first substrate 110.

The thickness of the reflective part 170 is formed to be smaller than the height of the liquid crystal layer 300 formed between the first substrate 110 and the second substrate 140. When the reflective part 170 is provided as described above, the interval between the reflective part 170 and the light sensors 130 of the first substrate becomes narrow. Therefore, as shown in FIG. 7B, when the contact is performed, the quantity of light emitted to the backlight assembly 100 and reflected onto the reflective part 170 to be incident on the light sensor 130 is reduced compared to the case before the contact is performed (FIG. 7A), thereby making it possible to more exactly sense the difference in the quantity of light.

Figure 8A:
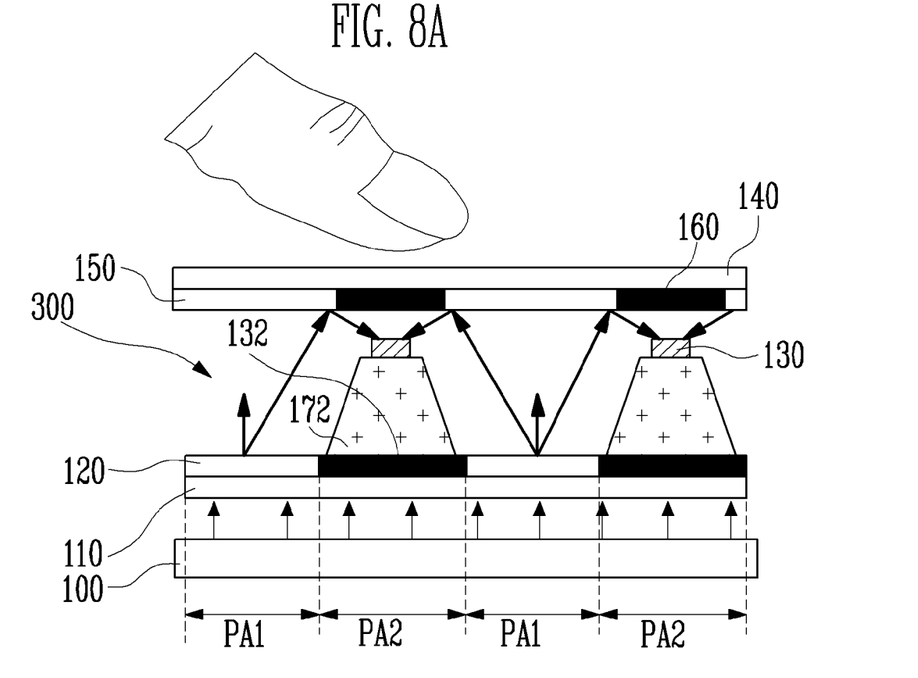
Figure 8B:
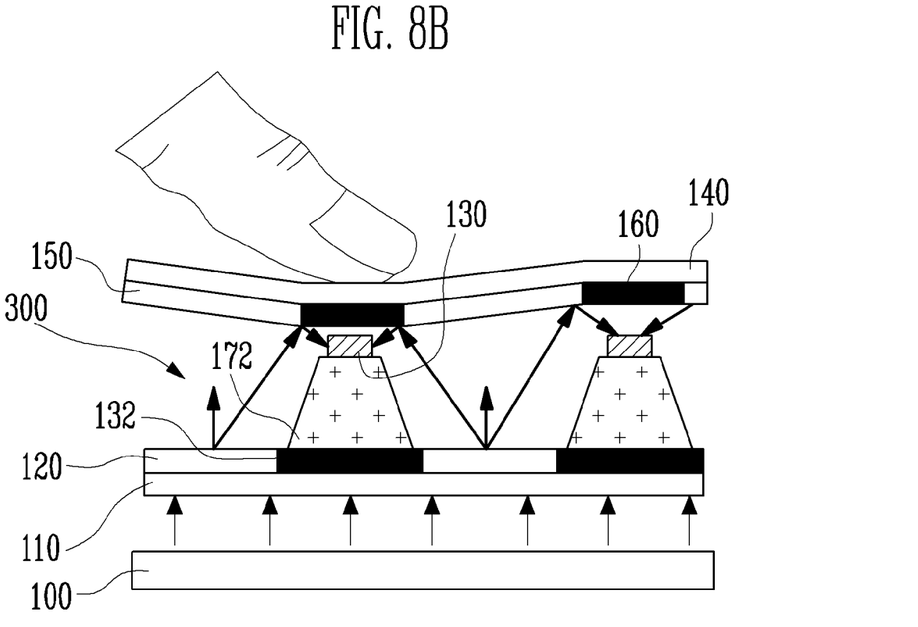
Figure 9A:
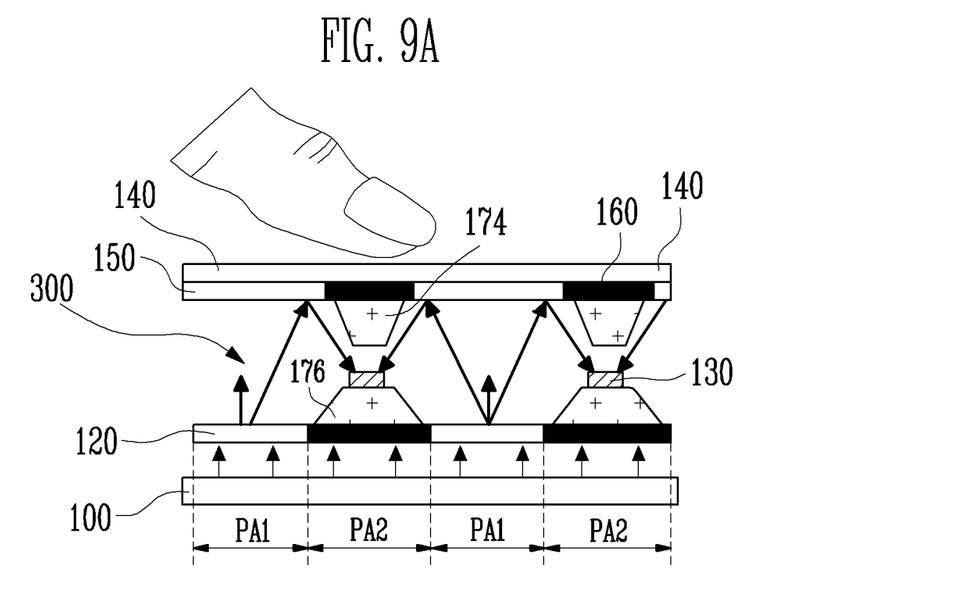
Figure 9B:
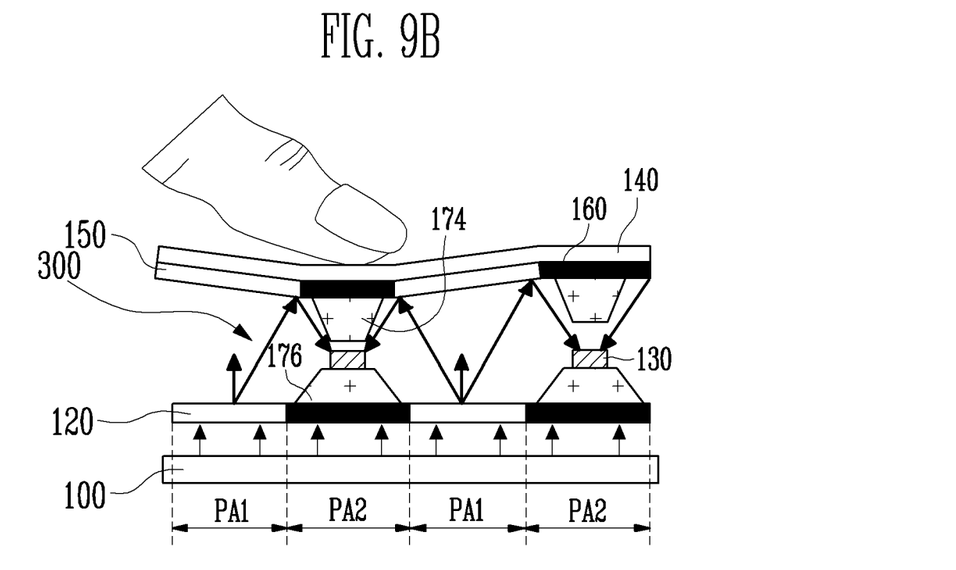

FIGS. 8A and 8B are an embodiment wherein a reflective part 172 is formed on the bottom surface of the sensor region PA2 of the first substrate 110, or in other words, on a bottom surface of the light sensor 130. FIGS. 9A and 9B are an embodiment wherein reflective parts 174 and 176 are formed on a bottom surface of the sensor region PA2 of the first substrate 110 and a bottom portion of the first black matrix 160, respectively. In the embodiment illustrated in FIGS. 8A and 8B, the principle and the operation of the embodiments are the same as those of the aforementioned embodiment of FIGS. 7A and 7B.

Figure 10:
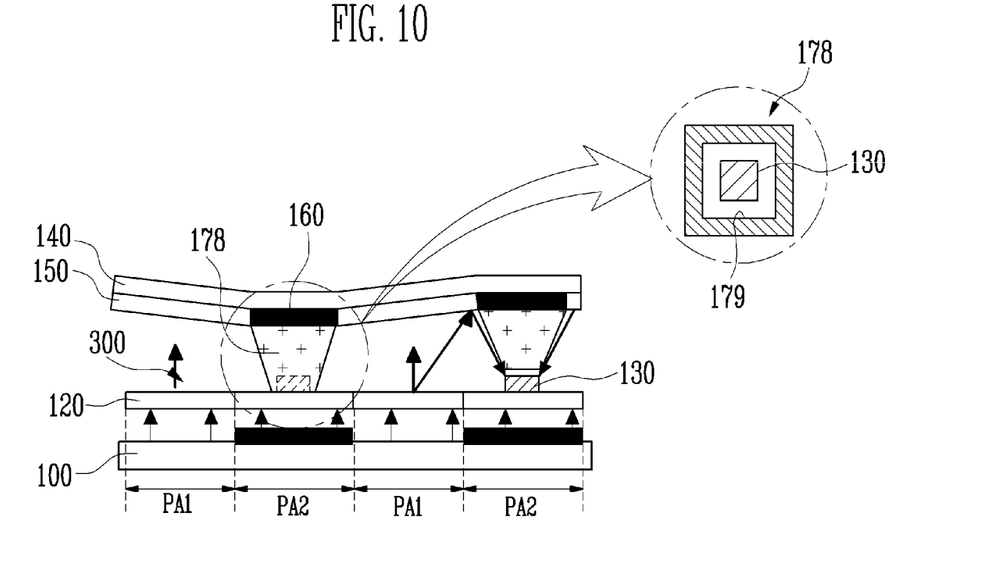

As shown in FIG. 10, a reflective part 178 is formed on a bottom portion of a first black matrix 160. The reflective part 178 is formed in a barrier rib shape 179 in order to surround the light sensor 130 when the contact is made. In this case, if the contact is made, the reflective light cannot be incident on the light sensor 130, and thus, a more precise touch recognition can be performed. As shown, the barrier rib 179 has a square shape, however, it is understood that other shapes can be used to surround the light sensor 130.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid crystal display device having a built in touch screen comprising:
    a first substrate having pixel units comprising:
        a plurality of pixels configured to display an image; and
        sensor regions having light sensors formed adjacent to corresponding ones of the pixel units, the light sensors being configured to sense a position of a contacted object;
    a second substrate on the first substrate, comprising:
        color filters formed on regions corresponding to the pixel units; and
        first black matrices overlapping the sensor regions of the pixel units;
    a plurality of first reflective parts formed on bottom surfaces of the first black matrices and having a cavity, the cavity of the first reflective parts being configured to enclose a corresponding one of the light sensors to block light from being incident upon the corresponding one of the light sensors;
    a liquid crystal layer between the first substrate and the second substrate; and
    a backlight assembly on a bottom portion of the first substrate and configured to provide emitted light to the first substrate and the second substrate.

2. The liquid crystal display device of claim 1, further comprising second black matrices formed on a first surface of the first substrate and corresponding to the sensor regions to prevent the emitted light from the backlight assembly being directly incident upon the light sensors.

3. The liquid crystal display device of claim 1, wherein the plurality of pixels are arranged in the pixel unit so that the plurality of pixels in each pixel unit correspond to red (R), green (G), and blue (B) colors.

4. The liquid crystal display device of claim 3, wherein the light sensors and the pixel units have at most a 1:1 ratio.

5. The liquid crystal display device of claim 1, wherein the light sensors are configured to detect a touch position by sensing a change in quantities of the emitted light emitted from the backlight assembly and reflected from the first black matrices to the light sensors.

6. The liquid crystal display device of claim 1, wherein the first reflective parts have a predetermined thickness.

7. The liquid crystal display device of claim 6, wherein the predetermined thickness of each of the first reflective parts is less than a thickness of the liquid crystal layer between the first substrate and the second substrate.

8. The liquid crystal display device of claim 6, wherein the first reflective parts are formed in a barrier rib shape.

9. The liquid crystal display device of claim 6, wherein the first reflective parts are configured to prevent the emitted light from being incident upon the corresponding one of the light sensors when a pressure is applied to the liquid crystal display device above the corresponding one of the light sensors, and wherein the first reflective parts are configured to allow the emitted light to be incident upon the corresponding one of the light sensors when the pressure is not applied to the liquid crystal display device above the corresponding one of the light sensors.

10. The liquid crystal display device of claim 1, further comprising second reflective parts having a predetermined thickness and formed on a bottom surface of the light sensors.

11. The liquid crystal display device of claim 10, wherein the first and second reflective parts are formed on bottom surfaces of the first black matrices and on bottom surfaces of the light sensors, respectively, so as to oppose each other.

12. A touch screen panel of a liquid crystal display device having a first substrate, a second substrate and a backlight assembly, the touch screen panel comprising:
 a first black matrix blocking light emitted from the backlight assembly and disposed on the second substrate opposing the first substrate;
 a light sensor sensing light blocked by the first black matrix and disposed between the first and the second substrates opposite the first black matrix, wherein the first black matrix overlaps the light sensor;
 a reflective part formed on a bottom surface of the first black matrix and having a cavity, the cavity of the reflective part being configured to enclose the light sensor to block light from being incident upon the light sensor; and
 a liquid crystal layer interposed between the first substrate and the second substrate.

13. The touch screen panel of claim 12, wherein the reflective part is configured to reflect an emitted light emitted from the backlight assembly onto the light sensor.

14. The touch screen panel of claim 13, further comprising a second black matrix between the light sensor and the first substrate, the second black matrix being configured to block outside light from being incident upon the light sensor.

15. The touch screen panel of claim 14, wherein the reflective part has a predetermined thickness.

16. The touch screen panel of claim 15, wherein the predetermined thickness of the reflective part is less than a thickness of the liquid crystal layer formed between the first substrate and the second substrate.

17. The touch screen panel of claim 16, wherein the reflective part is formed in a barrier rib shape.

18. The touch screen panel of claim 13, further comprising another reflective part having a predetermined thickness and formed on a bottom surface of the light sensors.

19. The touch screen panel of claim 18, wherein the reflective part and the another reflective part are formed so as to oppose each other.

20. The touch screen panel of claim 13, wherein the reflective part is configured to surround the light sensor and prevent the emitted light from being incident upon the light sensors when a pressure is applied on the second substrate adjacent to the reflective part, and to allow the emitted light to be incident upon the light sensors when the pressure is not applied on the second substrate adjacent to the reflective part.

* * * * *